(12) United States Patent
Elliott et al.

(10) Patent No.: US 7,584,378 B2
(45) Date of Patent: Sep. 1, 2009

(54) RECONFIGURABLE FC-AL STORAGE LOOPS IN A DATA STORAGE SYSTEM

(75) Inventors: John C. Elliott, Tucson, AZ (US);
Robert A. Kubo, Tucson, AZ (US);
Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 11/470,907

(22) Filed: Sep. 7, 2006

(65) Prior Publication Data

US 2008/0126733 A1 May 29, 2008

(51) Int. Cl.
*G06F 11/00* (2006.01)
(52) U.S. Cl. .............................. 714/5; 714/42
(58) Field of Classification Search ...................... 714/5, 714/7, 42
See application file for complete search history.

(56) References Cited

U.S. PATENT DOCUMENTS

| | | | | |
|---|---|---|---|---|
| 5,991,891 A * | 11/1999 | Hahn et al. ...................... 714/4 |
| 6,219,753 B1 * | 4/2001 | Richardson .................. 711/114 |
| 6,862,690 B1 * | 3/2005 | Bezera et al. ................... 714/4 |
| 7,043,665 B2 * | 5/2006 | Kern et al. ...................... 714/5 |
| 7,111,087 B2 * | 9/2006 | Jiang et al. .................... 710/36 |
| 7,246,262 B2 * | 7/2007 | Nagata et al. .................. 714/8 |
| 7,302,539 B2 * | 11/2007 | Korgaonkar et al. ......... 711/162 |
| 2003/0005352 A1 * | 1/2003 | Beer et al. ...................... 714/4 |
| 2003/0229767 A1 | 12/2003 | Lee et al. |
| 2004/0030826 A1 | 2/2004 | Knapp, III et al. |
| 2005/0005001 A1 | 1/2005 | Hara et al. |
| 2005/0228937 A1 | 10/2005 | Karr et al. |
| 2005/0228943 A1 | 10/2005 | DeCenzo et al. |
| 2005/0281273 A1 * | 12/2005 | Lucas et al. .................. 370/401 |
| 2007/0174662 A1 * | 7/2007 | Zelikov et al. .................. 714/5 |
| 2008/0126850 A1 * | 5/2008 | Kubo et al. ..................... 714/7 |

* cited by examiner

*Primary Examiner*—Marc Duncan
(74) *Attorney, Agent, or Firm*—Dan Shifrin

(57) ABSTRACT

Data storage systems and methods and computer program product for managing data storage systems are provided. The system includes at least first and second storage enclosures, each having a plurality of hard disks configured as first and second arrays of disks and an intra-enclosure path between the first and second arrays. The intra-enclosure path is disabled during normal operation of the storage system. Inter-enclosure paths respectively link the first arrays in the first and second storage enclosures and the second arrays in the first and second storage enclosures and are enabled during normal operation of the storage system. The system also includes a controller having a first path to the first array in the first enclosure and a second path to the second array in the first enclosure whereby, during normal operation of the system, the first arrays in the first and second enclosures are configured as a first storage loop and the second arrays in the first and second enclosures are configured as a second storage loop. The controller is configured to detect a failure in the first array of the first enclosure and to enable the intra-enclosure path between the first and second arrays in the second enclosure whereby the second storage loop is reconfigured to include the first array in the second enclosure.

29 Claims, 13 Drawing Sheets

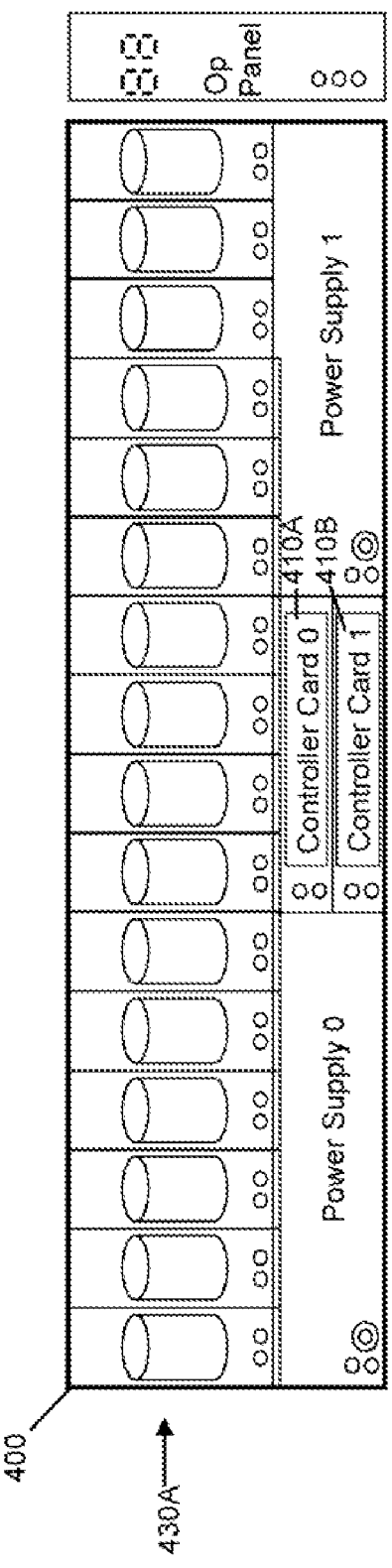
Fig. 4A Front View
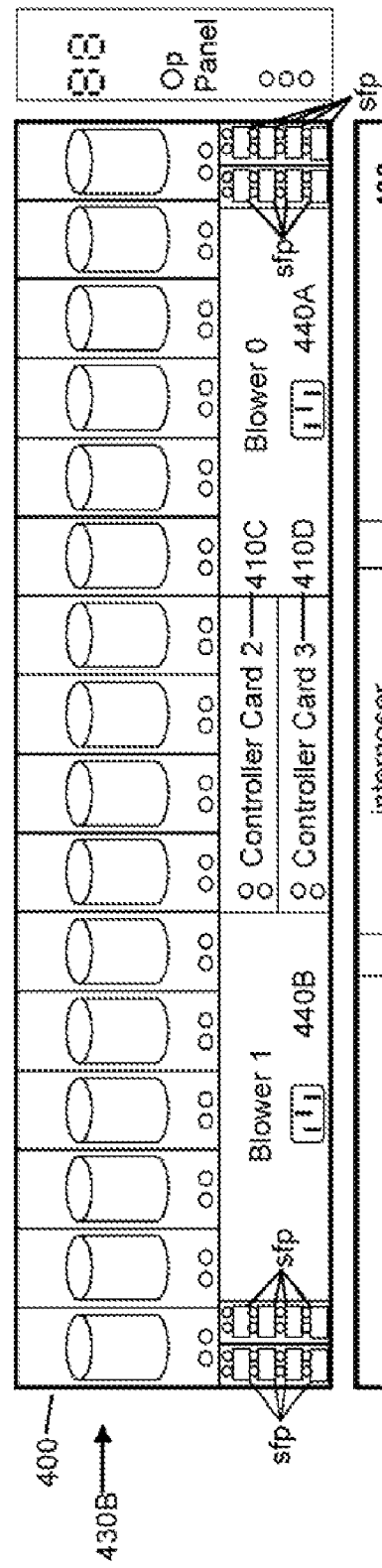
Fig. 4B Rear View
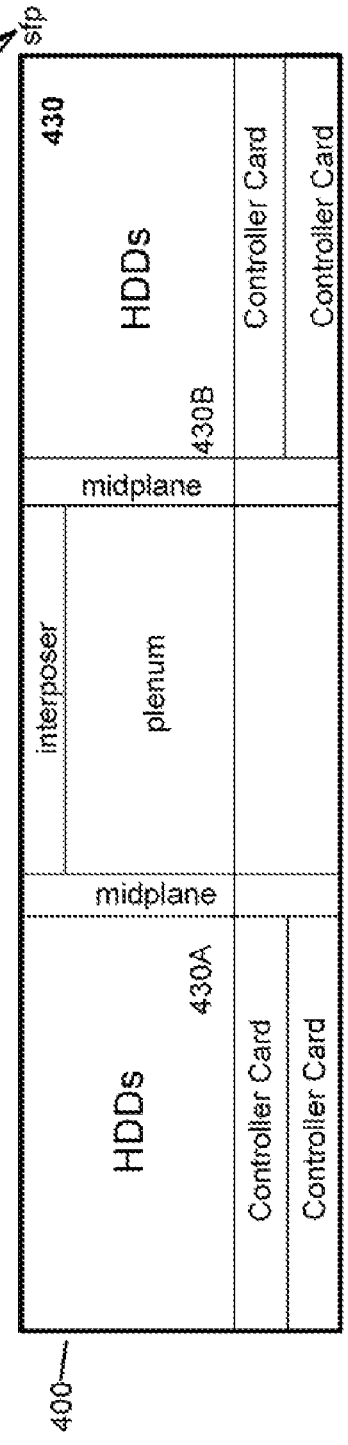
Fig. 4C Right Side View

RECONFIGURABLE FC-AL STORAGE LOOPS IN A DATA STORAGE SYSTEM

RELATED APPLICATION DATA

The present application is related to commonly-assigned and co-pending U.S. application Ser. Nos. 11/470,834, entitled LOGICAL PARTITIONING OF DISK STORAGE ENCLOSURE, 11/470,856, entitled ESTABLISHING COMMUNICATIONS ACROSS VIRTUAL ENCLOSURE BOUNDARIES, and 11/470,885, entitled FLEXIBLE DISK STORAGE ENCLOSURE, filed on the filing date hereof, which applications are incorporated herein by reference in their entireties.

TECHNICAL FIELD

The present invention relates generally to data storage enclosures and; in particular, to reconfiguring storage loops to bypass a failed storage device in a densely populated storage enclosure.

BACKGROUND ART

FIG. 1 is a block diagram of a low density storage enclosure 100. The storage enclosure 100 includes a pair of redundant controller cards 110A, 110B, redundant power supplies 120A, 120B and sixteen disk drive modules (DDMs, also referred to as storage drives, hard disk drives or HDDs) indicated generally as 130. The storage enclosure 100 also includes an enclosure midplane 140 and front and rear panels 150A, 150B. As illustrated in FIG. 2, each controller card 110A, 110B includes a switch 112A, 112B, interconnected through the midplane to the storage drives 130, and a storage enclosure services (SES) processor 114A, 114B which manages various enclosure-related processes, such as power and cooling. Due to the interconnection through the midplane between the SES processors 114A, 114B, in the event that one of the controller cards 110A, 110B fails, the other SES processor may take over. FIG. 3 illustrates the interconnection of the power supplies 120A, 120B with the controller cards 110A, 110B and the DDMs 130 within the enclosure 100.

SUMMARY OF THE INVENTION

When additional DDMs, such as another sixteen, are installed in the enclosure 100 software, firmware and microcode designed for a sixteen-drive enclosure may not be able to accommodate the increased density. To control development effort and resources it is desirable to preserve the existing software, firmware and microcode base with minimal changes, while increasing the storage device density per unit of rack space. A single mechanical enclosure package that can accommodate multiple instances of enclosure designs that preserves the existing software, firmware, and microcode base interfaces is therefore highly desirable.

The present invention provides a data storage system comprising first and second storage enclosures. Each storage enclosure includes a disk controller partitioned as first and second controller instances, a plurality of hard disks configured as first and second arrays of disks and managed by the first and second controller instances, respectively, and an intra-enclosure path between the first and second arrays. The intra-enclosure path is disabled during normal operation of the storage system, The data storage system further comprises a first inter-enclosure path between the first array in the first storage enclosure and the first of array in the second storage enclosure, the first inter-enclosure path being enabled during normal operation of the storage system and a second inter-enclosure path between the second array in the first storage enclosure and the second array in the second storage enclosure, the second inter-enclosure path being enabled during normal operation of the storage system.

The data storage system of the present invention also comprises a controller having a first path to the first array in the first enclosure and a second path to the second array in the first enclosure whereby, during normal operation of the system, the first arrays in the first and second enclosures are configured as a first storage loop and the second arrays in the first and second enclosures are configured as a second storage loop. The controller is configured to detect a failure in the first array of the first enclosure and to enable the intra-enclosure path between the first and second arrays in the second enclosure whereby the second storage loop is reconfigured to include the first array in the second enclosure.

The present invention also provides a method for managing a data storage system, The data storage system includes a plurality of storage enclosures, each having first and second disk arrays. A first storage loop includes the first array of each enclosure and a second storage loop includes the second array of each enclosure. An intra-enclosure path between first and second disk arrays of each storage enclosure is disabled during normal operation of the data storage system. A failure in the first array of the first storage enclosure is detected. The intra-enclosure path between the first and second disk arrays in the second storage enclosure is then enabled and the second storage loop is reconfigured to include the first disk array in the second enclosure.

The present invention also includes other embodiments, including a RAID storage system, a method for managing a RAID storage system, a computer program product having computer-readable code embodied therein for managing a data storage system, and a method for deploying computing infrastructure.

BRIEF DESCRIPTION OF THE DRAWINGS

FIGS. 4A, 4B, 4C illustrate front, rear and right side views, respectively, of a high density storage enclosure in which the present invention may be incorporated;

DETAILED DESCRIPTION OF THE PREFERRED EMBODIMENT

Figure 1:
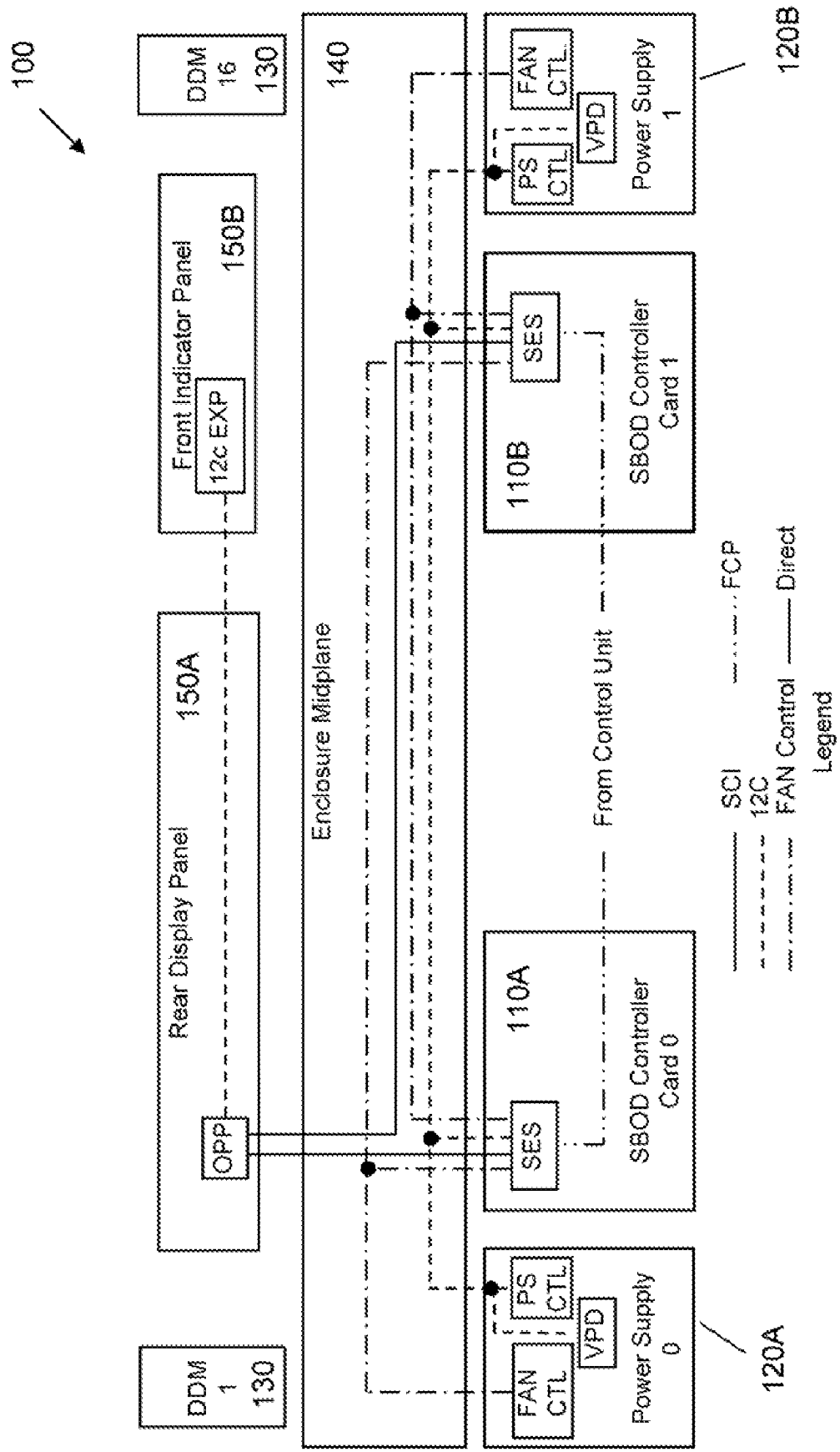
FIG. 1 is a block diagram of a low density storage enclosure.
Figure 2:
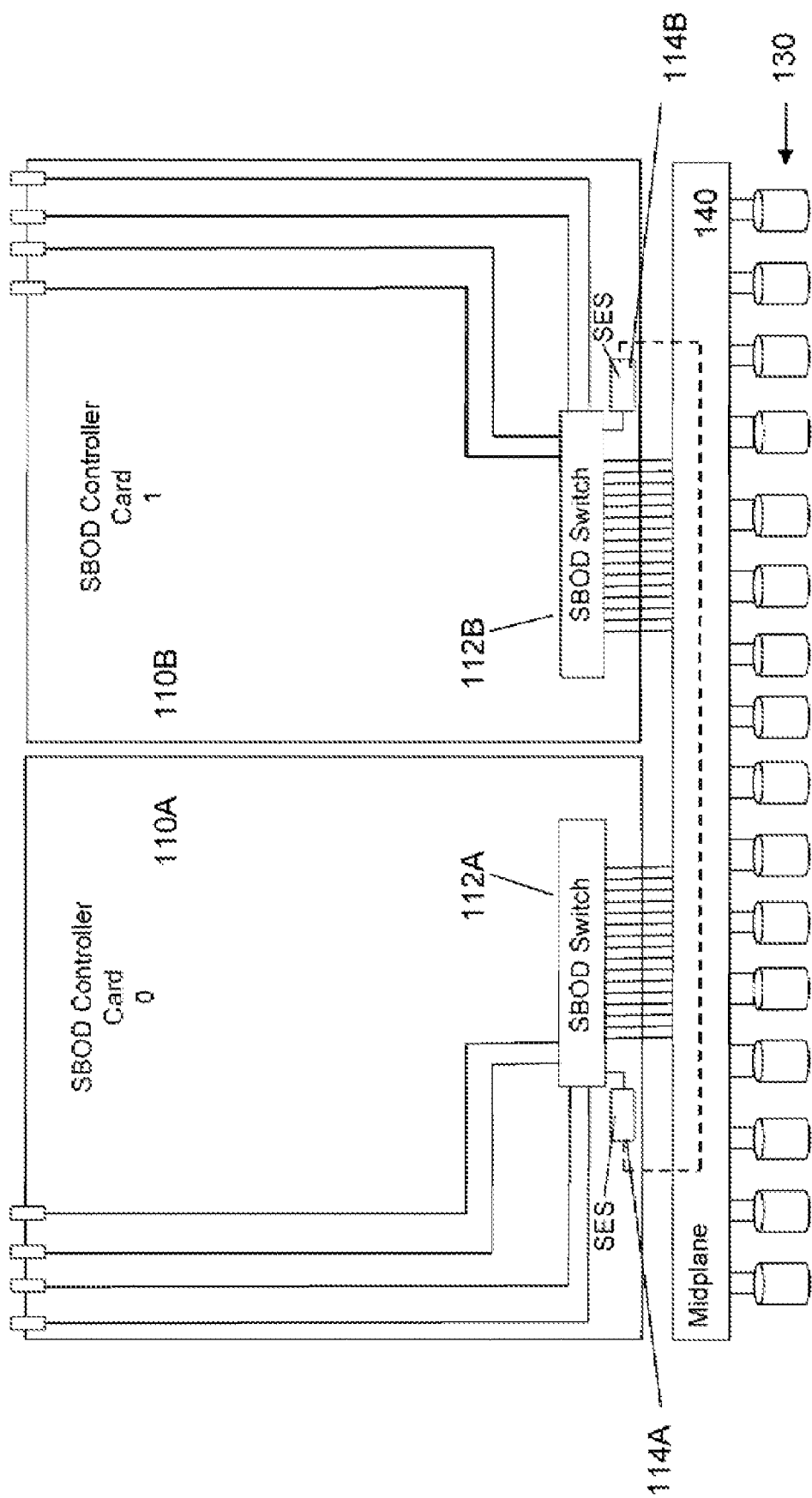
FIG. 2 is a block diagram illustrating interconnections of the controller cards of the storage enclosure of FIG. 1.
Figure 3:
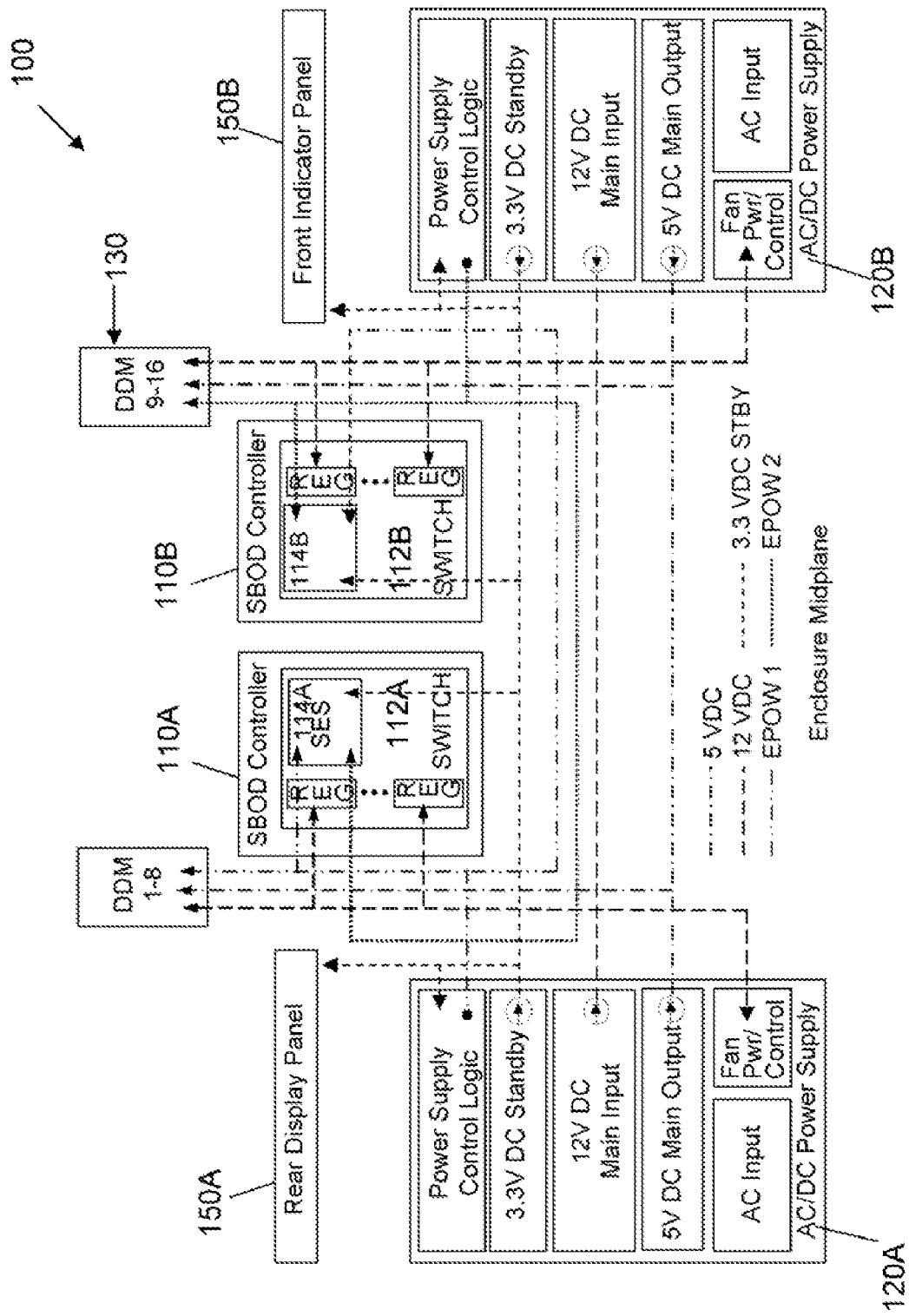
FIG. 3 is a block diagram illustrating the power distribution within the storage enclosure of FIG. 1.

FIGS. 4A, 4B, 4C are representative front, rear and right side views, respectively, of a high density storage enclosure 400 in which thirty-two DDMs 430 have been installed, double the number in the enclosure of FIG. 1. In addition, the enclosure 400 includes two pairs of redundant controller cards 410A and 410B, 410C and 410D as well as a pairs of redundant power supplies 420A, 420B and blowers 440A, 440B. If desired, the enclosure 400 may be configured with a single instance of a storage enclosure (16 DDMs and a single pair of controller cards) by populating a single pair of controller cards in the enclosure and restricting the population of the DDMs to an appropriate placement within the enclosure.

Figure 5A:
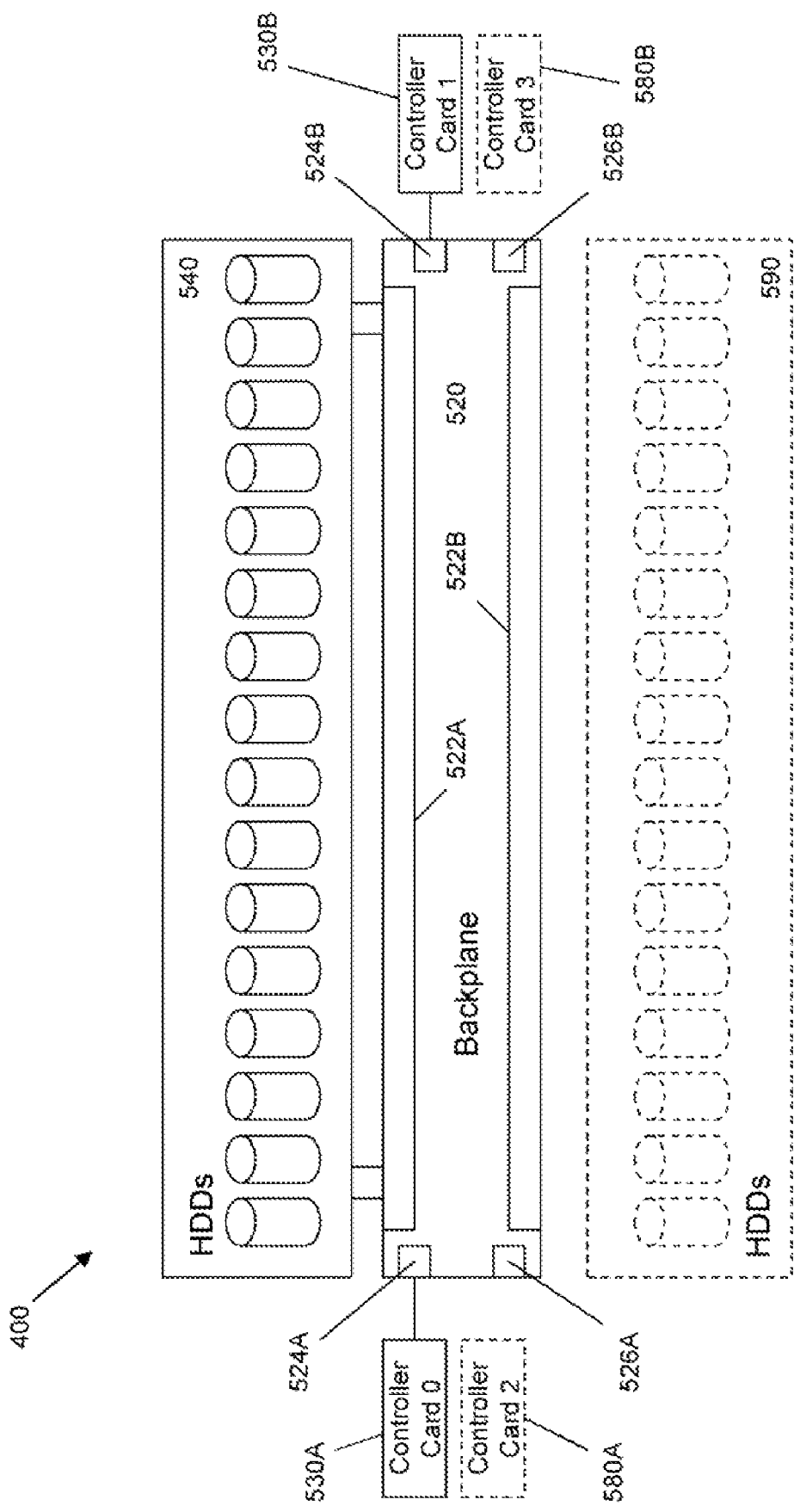
FIG. 5A is a block diagram of a flexible low- or high-density storage enclosure configurable as a single enclosure or as multiple virtual enclosures.

Implementing the present invention and as illustrated in FIG. 5A, a vendor may market a highly flexible storage enclosure, one which is configurable in a number of different ways. In one configuration, the enclosure 400 may be populated in a low density fashion, such as with up to sixteen drives 540 installed in drive connectors 522A on a backplane 520 and two redundant controller cards 530A, 530B installed in controller card connectors 524A, 524B on the backplane 520. In a second configuration, the enclosure 400 may be populated in a high density fashion, such as with up to an additional sixteen drives 590 installed in drive connectors 522B and an additional pair of redundant controller cards 580A, 580B installed in card connectors 526A, 526B, configured as two virtual storage enclosures (as will be described with respect to FIG. 5B). In a third configuration, the enclosure 400 may be populated in a high density fashion, such as with thirty-two drives, but configured as a single storage enclosure.

Figure 5B:
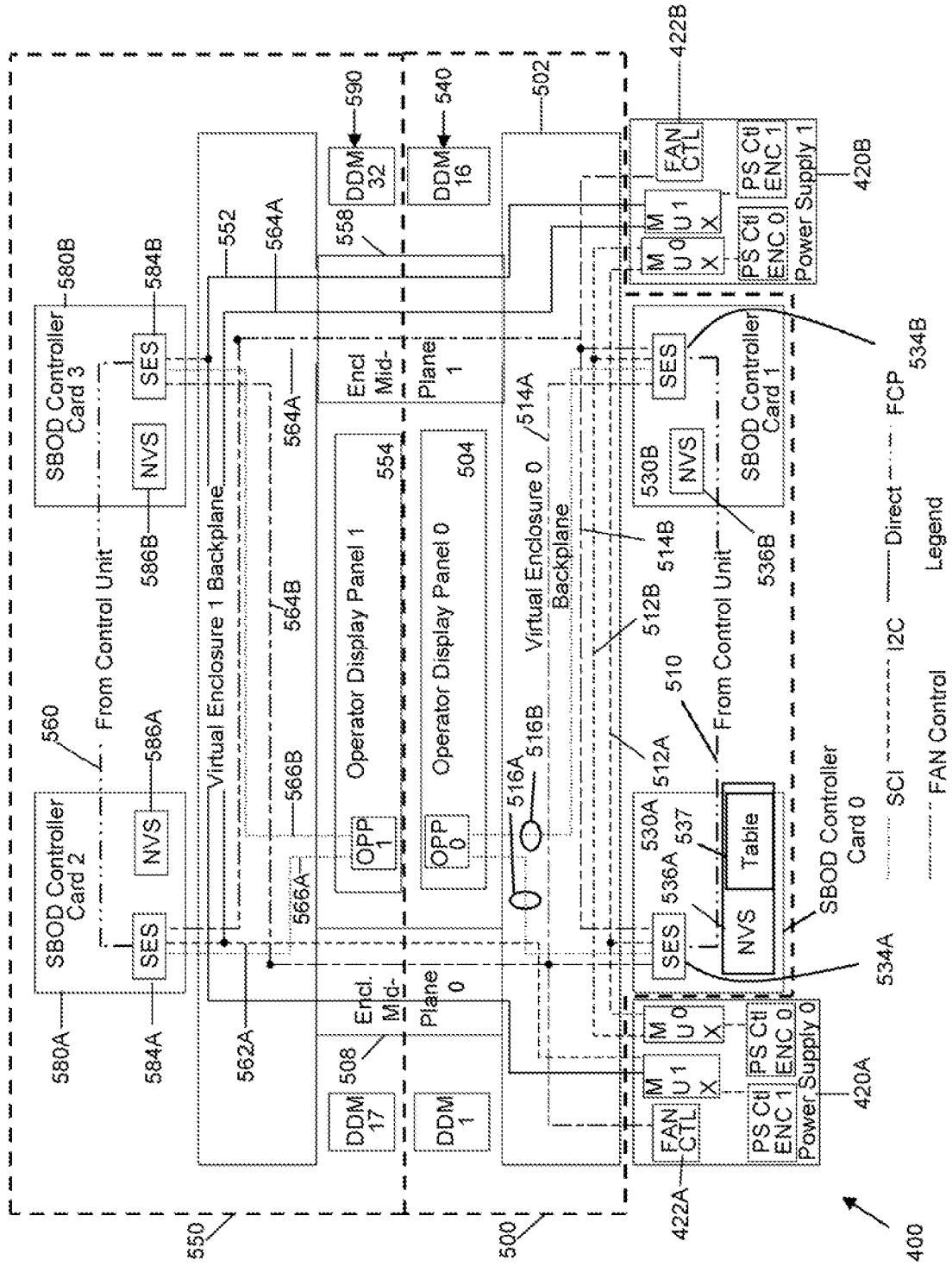
FIG. 5B is a block diagram of the flexible storage enclosure of FIG. 5A in a high-density configuration partitioned into two virtual enclosures on independent domains.
Figure 10:
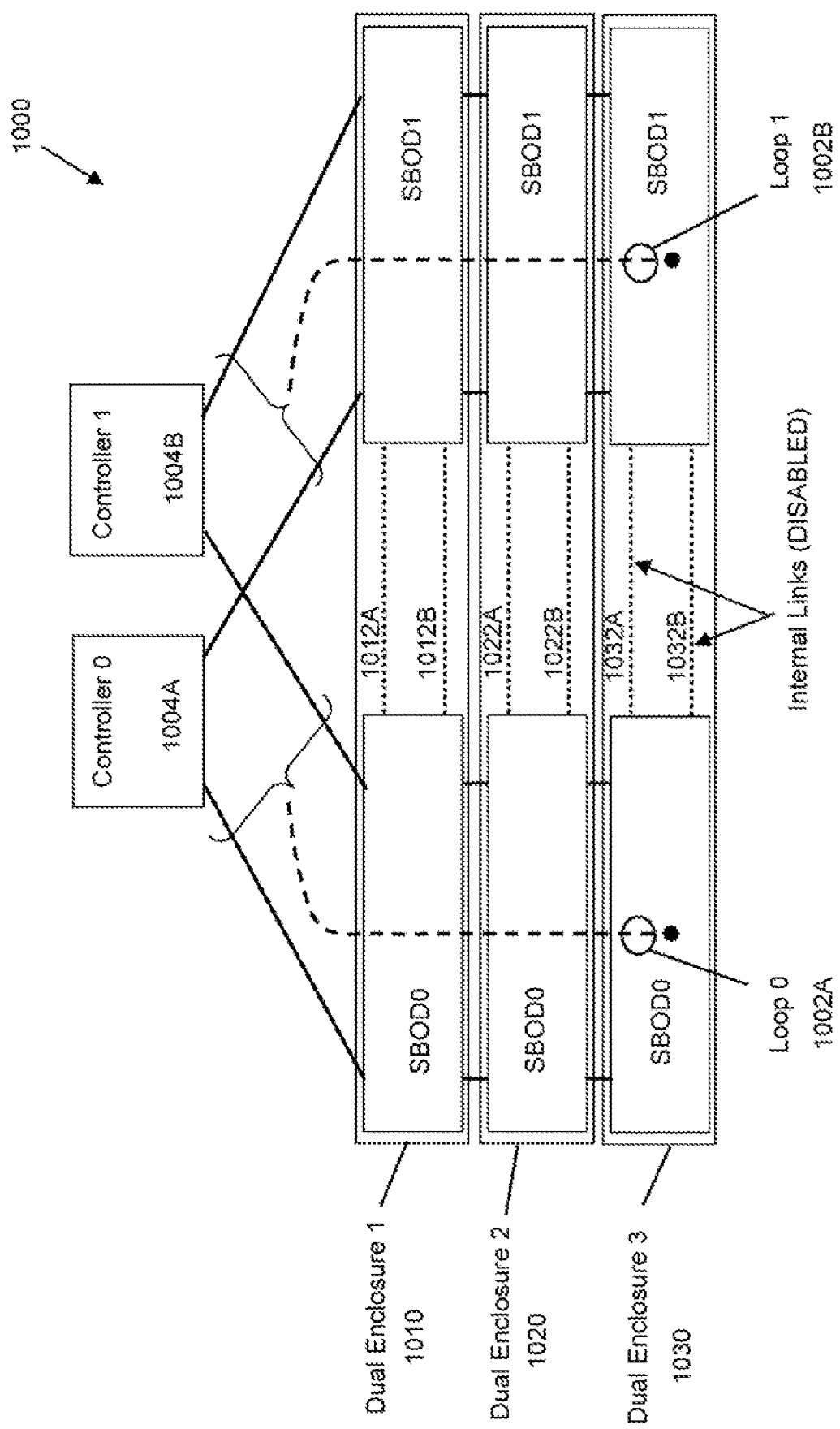
FIG. 10 is a representation of a system with multiple cascaded SBODs in two loops.
Figure 11:
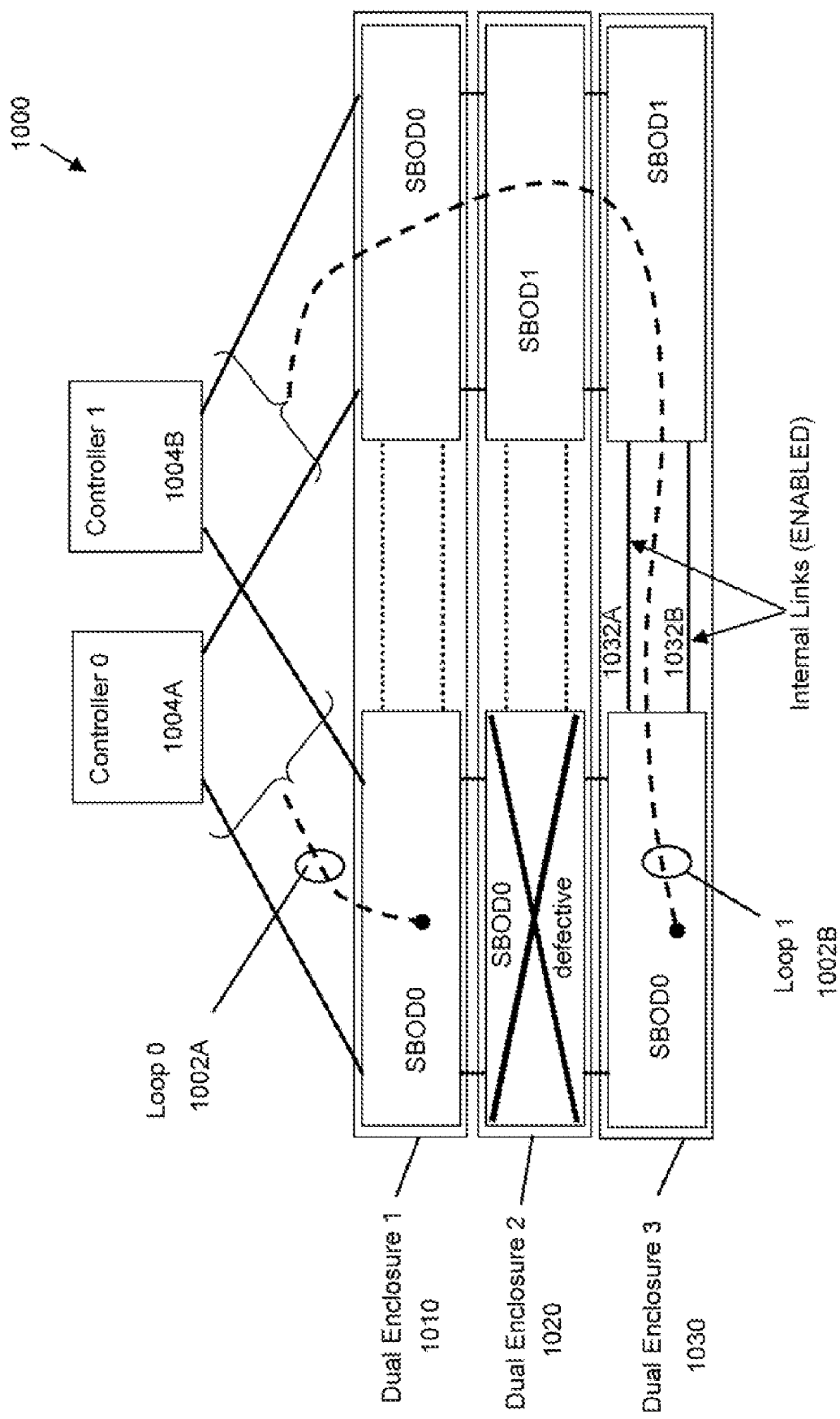
FIG. 11 a representation of the system of FIG. 10 in which a defective SBOD in one loop is bypassed in accordance with the present invention.

FIG. 5B is a block diagram of the storage enclosure 400 of FIG. 5A in a high-density configuration and partitioned into two virtual enclosures 500, 550. As will be described below, each power supply 420A, 420B may each be associated with one of the virtual enclosures although they are shared by both virtual enclosures 500, 550 for redundancy purposes. The first virtual enclosure 500 includes sixteen DDMs 540 and a redundant pair of controller cards 530A, 530B. Both controller cards 530A, 530B include a switch 532A, 532B (see FIG. 7), a SCSI enclosure services (SES) processor 534A, 534B and associated memory, such as nonvolatile storage (NVS) 536A, 536B. The backplane 520 may be partitioned into two (or more) virtual backplanes 502, 552 as part of the two virtual enclosures 500, 550, respectively. One virtual backplane 502 interconnects the components of the first virtual enclosure 500 and an operator display panel 504 provides a display of the status of the enclosure 500. A path 510, such as a Fibre Channel/Arbitrated Loop (FC-AL) link, interconnects the two SES processors 534A, 534B with an external system control unit (system controllers 1004A, 1004B are illustrated in FIGS. 10 and 11 and are collectively referred to herein as the system control unit or system controller 1004). Redundant paths 512A, 512B, such as an inter-IC ($I^2C$) bus, provide control paths from each SES processor 534A, 534B to each power supply 420A, 420B. Similarly, redundant paths 514A, 514B provide control paths from each SES processor 534A, 534B to a fan controller 422A, 422B in each power supply 420A, 420B. And, paths 516A, 516B interconnect each SES processor 534A, 534B with the first operator display panel 504.

Similarly, the second virtual enclosure 550 includes sixteen DDMs 590 and a redundant pair of controller cards 580A, 580B. Both controller cards 580A, 580B include a switch 532A, 532B (see FIG. 7), an SES processor 584A, 584B and associated memory, such as NVS 586A, 586B. The second virtual backplane 552 interconnects the components of the second virtual enclosure 550 and an operator display panel 554 provides a display of the status of the enclosure 550. A path 560, such as an FC-AL link, interconnects the two SES processors 584A, 584B with the external system control units 1104. Redundant paths 562A, 562B such as an $I^2C$ bust provide control paths from each SES processor 584A, 584B to each power supply 420A, 420B. Similarly, redundant paths 564A, 564B provide control paths from each SES processor 584A, 584B to a fan controller 422A, 422B in each power supply 420A, 420B. And, paths 566A, 566B interconnect each SES processor 584A, 584B with the second operator display panel 554.

Virtual enclosure midplanes 508, 558 interconnect the backplanes 502, 552 of the two virtual enclosures 500, 550. Thus, the logical partitioning of the physical enclosures provides each of the two virtual enclosures 500, 550 with the disk fabric loop or network interconnections that they would have in the single enclosure design of FIG. 1. It will be appreciated that the physical enclosure may be configured as more than two virtual enclosures within the scope of the present invention.

The controlling software, firmware or microcode is substantially the same with any of the three arrangements. The enclosure configuration may be performed when the enclosure 400 is installed or modified in a customer's facility. The SES processors 534A, 534B, 584A, 584B are coupled to a configuration unit, such as the system control unit 1004, via the lines 510, 560 (FIG. 5B). One of the virtual enclosures, such as the first enclosure 500, is designated as the master enclosure and one of the SES processors in the master enclosure, such as processor 534A, is designated as the master processor (although the other SES processor 534B may instead be designated as the master). Nonvolatile storage 536A associated with the master processor 534A stores an SES table 537 into which parameters are loaded from the configuration unit to define the enclosure configuration. The table 537 is then accessed by the master processor 534A and enables and disables links within the physical enclosure 400 to configure the enclosure 400 with a single instance of a storage enclosure or with multiple virtual enclosures.

Figure 6A:
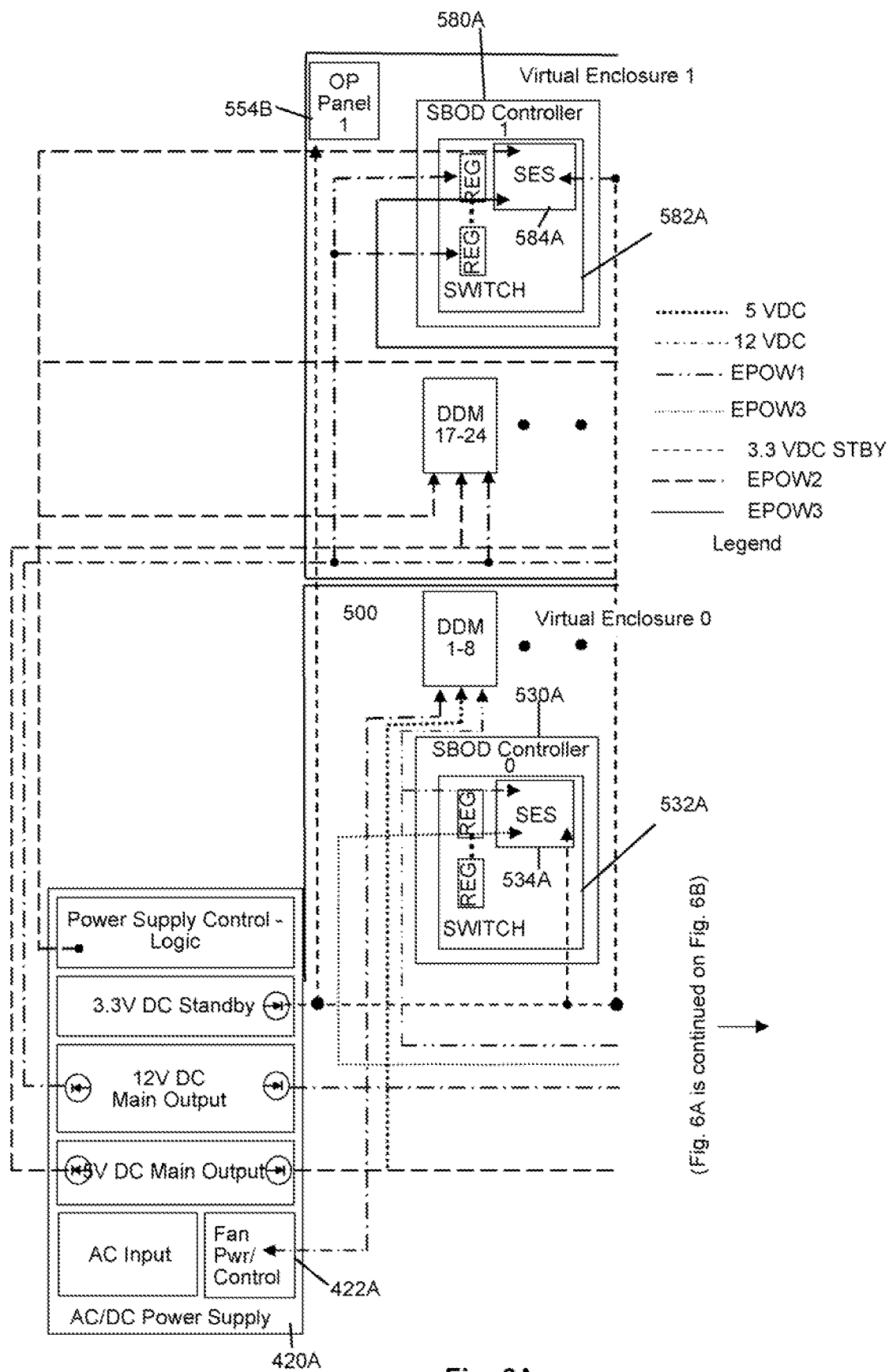
FIGS. 6A and 6B are a block diagram of the power distribution system of the high-density storage enclosure of FIG. 5B.
Figure 6B:
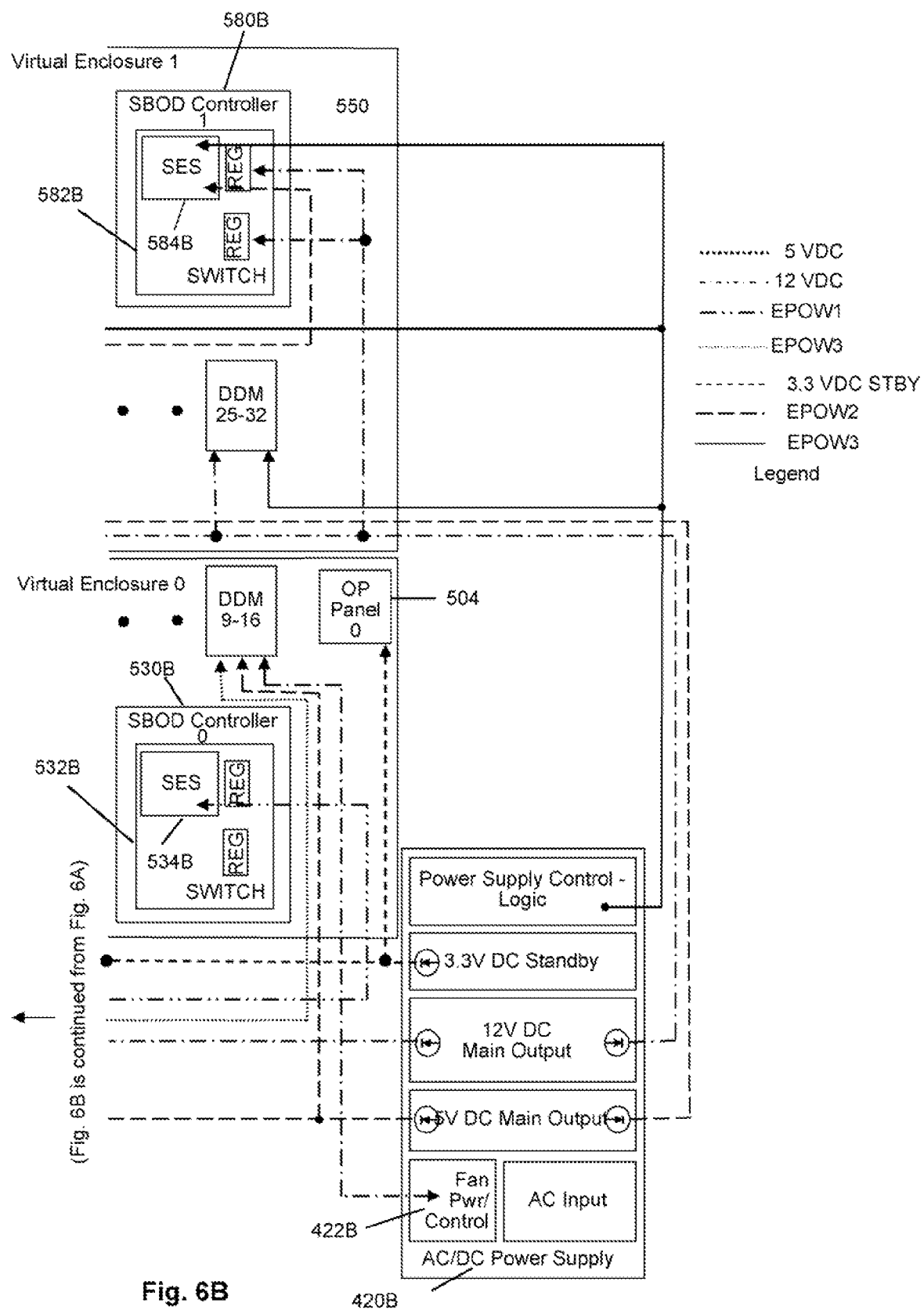

FIGS. 6A and 6B are a block diagram of the distribution of power from the power supplies 420A, 420B to the various components of the two virtual enclosures 500, 550. As with the disk fabric network interconnections, the logical partitioning of the physical enclosures provided each of the two virtual enclosures 500, 550 with the power distribution and control functions that they would have in the single enclosure design of FIG. 1. According to the present invention, the first power supply 420A and first blower 440A (FIG. 4B) and the second power supply 420B and second blower 440B (FIG. 48) each have independently controlled power outputs for the virtual enclosures 500 and 550. When the system is configured as a single unit, the outputs are coordinated as a single redundant power system. When configured as virtual enclosures, the outputs are controlled to allow each enclosure instance to manage the outputs as a separate redundant power system for each one.

Figure 7:
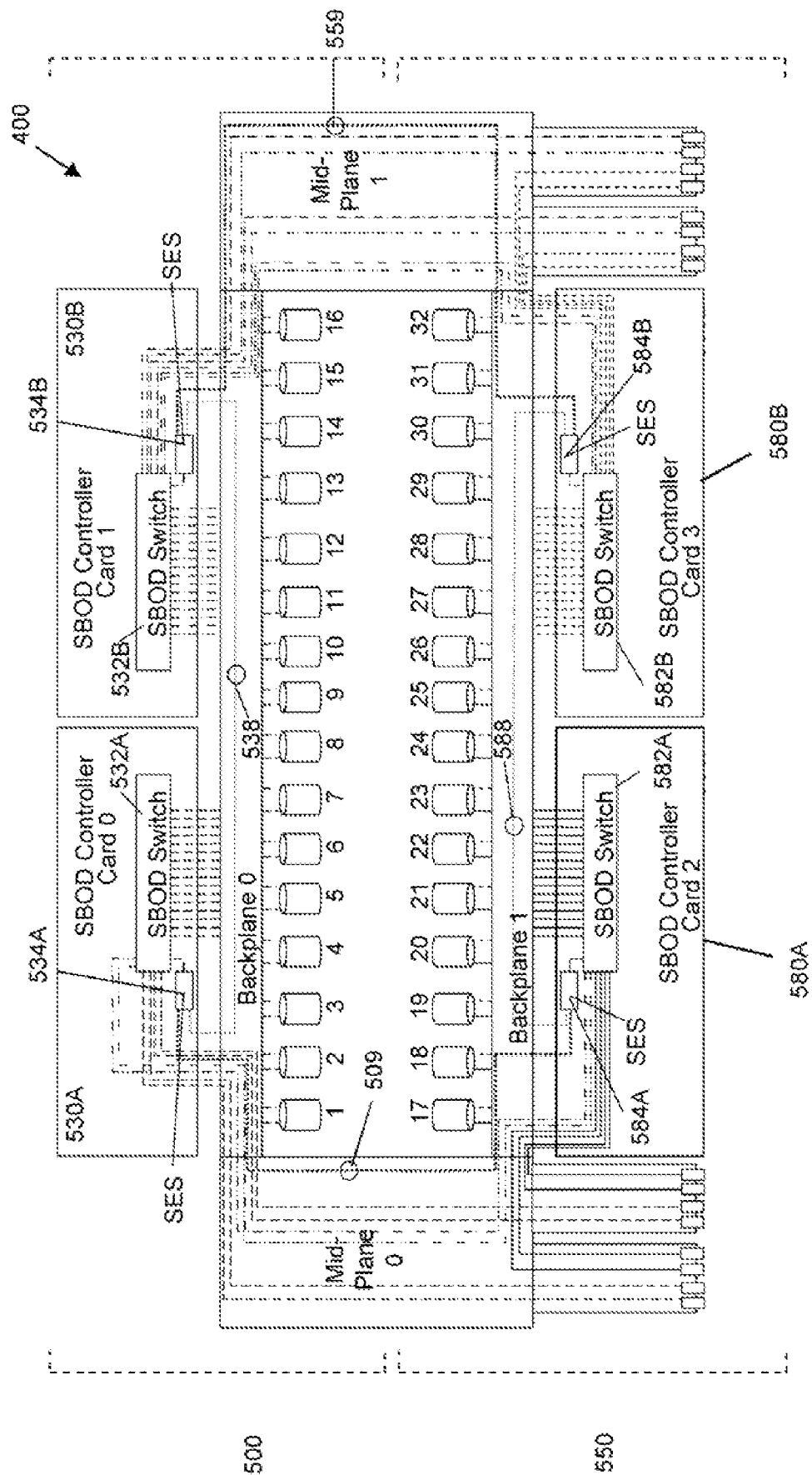
FIG. 7 is a block diagram of a dual-virtual high-density storage enclosure highlighting inter-virtual enclosure communications.

FIG. 7 is a block diagram of the dual-virtual enclosure high-density storage enclosure 400 of the present invention highlighting communications paths among the SES processors 534A, 534B, 584A, 584B of the two virtual enclosures 500, 550. One link 538 in the first virtual enclosure 500 provides intra-enclosure communication between the SES processors 534A, 534B while a corresponding link 588 in the second virtual enclosure 550 provides intra-enclosure communication between the SES processors 584A, 584B, thereby providing redundancy and allowing the storage enclosure 400 to remain in operation in the event one SES processor fails. Another link 509 provides inter-enclosure communication between the SES processor 534A on a controller card 530A in the first virtual enclosure 500 and the SES processor 584A on a controller card 580A in the second virtual enclosure 550. And, a corresponding link 559 provides inter-enclosure communication between the SES processor 534B on the other controller card 530B in the first virtual enclosure 500 and the SES processor 584B on the other controller card 580B in the second virtual enclosure 550. In the present invention, during normal operations, the inter-enclosure links 509, 559 are disabled.

Figure 8:
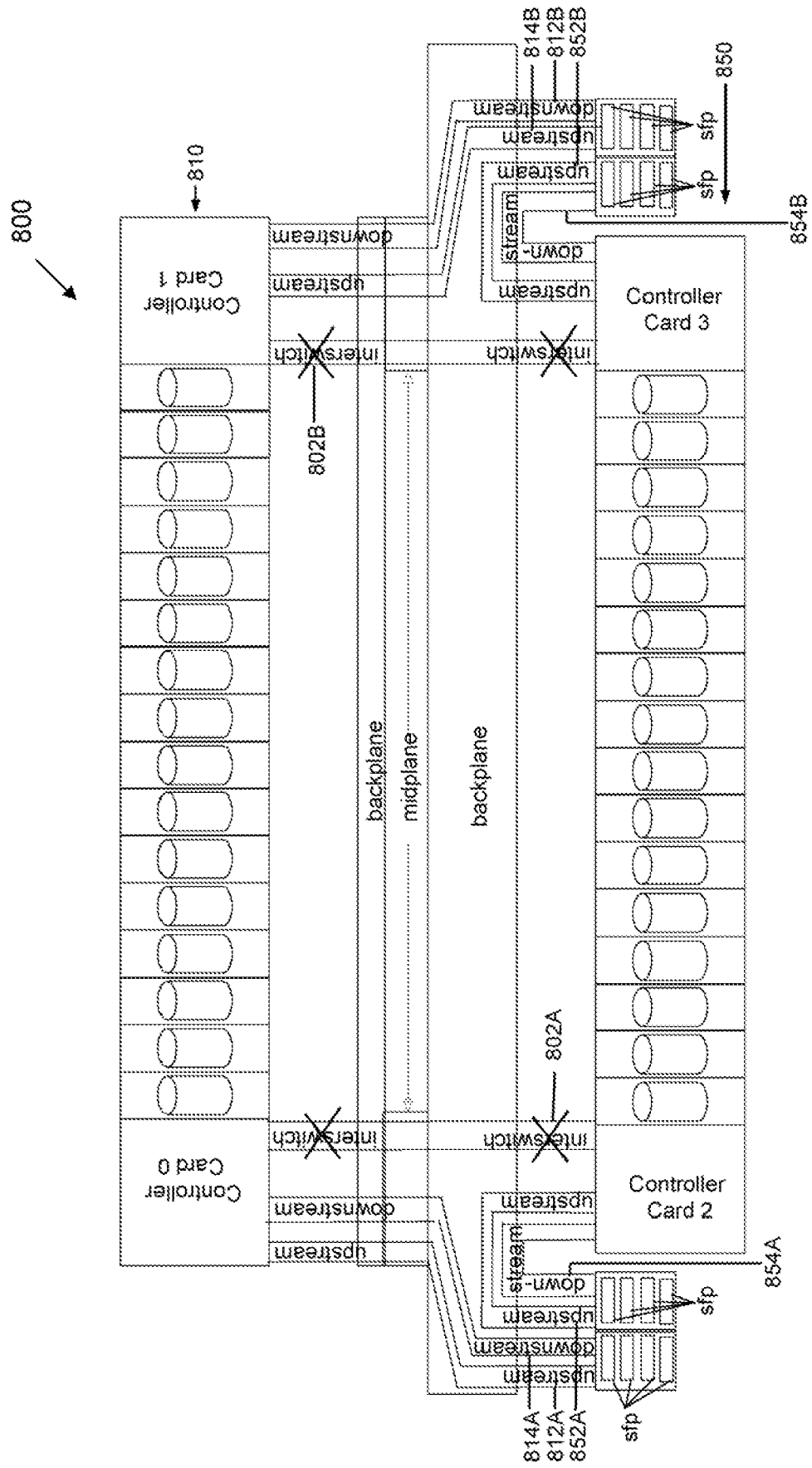
FIG. 8 is a representation of an embodiment of the present invention in which two virtual (logical) enclosures are configured as independent virtual enclosures.

FIG. 8 is a representation of an embodiment of the present invention in which two virtual (logical) enclosures 810, 850 of a physical enclosure 800 are configured as independent virtual enclosures in independent fabric loops or domains. In such a configuration, inter-switch links 802A, 802B are disabled and each virtual enclosure 810, 850 has its own independent redundant instances of input (upstream) ports 812A, 812B and 852A, 952B, respectively, and output (downstream) ports 814A, 814B and 854A, 854B, respectively.

Figure 9:
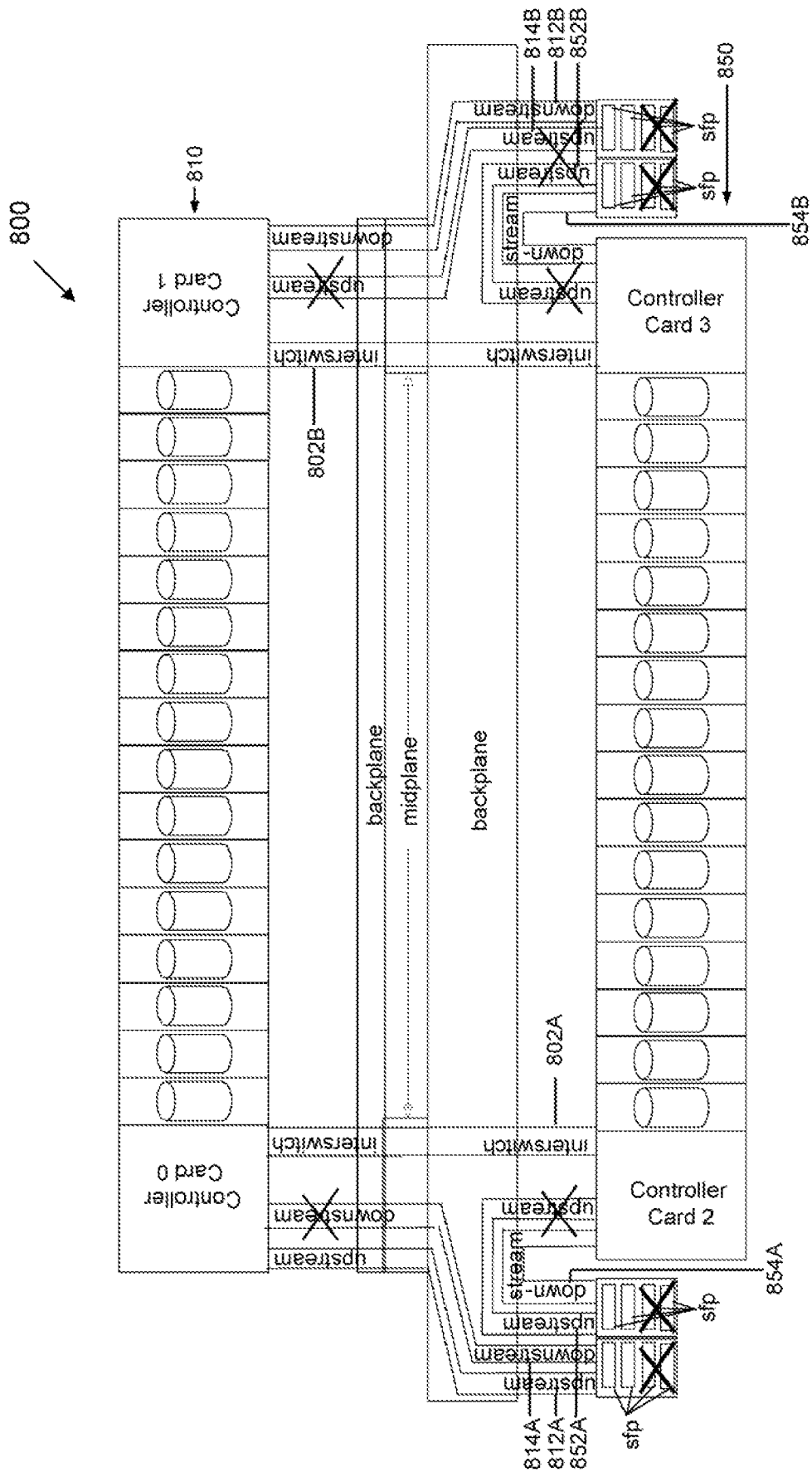
FIG. 9 is a representation of an embodiment of the present invention in which two logical enclosures in a trunked (or cascaded string) configuration.

FIG. 9 is a representation of an embodiment of the present invention in which the two logical enclosures 810, 850 are configured in a trunked (or cascaded string) manner. In this configuration, the inter-switch links 802A, 802B are enabled. The two virtual enclosures 810, 850 share a single instance of input and output connector ports, one set of input ports 852A, 852B are disabled and one set of output ports 814A, 814B are similarly disabled. Thus, one set of input ports 812A, 812B and one set of output ports 854A, 854B serve the entire enclosure 800 with inter-enclosure communications being conducted over the pair of inter-switch links 802A, 802B.

Thus, a single, high density, physical enclosure 800 may be easily provided as either configuration by including or excluding certain interconnections and by programming the SES processors. For example, a customer preferring to reduce the cost of the device by eliminating the cost of certain interconnect components (such as four cables and eight small form factor pluggable connections may chose to acquire the device in the internally trunked configuration described in FIG. 9. Alternatively, a customer may prefer the greater reliability of distributed storage by configuring the virtual enclosures on independent loops which may be coupled to separate control units, As illustrated in FIG. 10, a system 1000 may provide that SBODs (switched bunch of disks) in multiple enclosures be cascaded in dual independent loops 1002A, 1002B with both loops managed by redundant controllers 1004A, 1004B. Each loop 1002A, 1002B includes SBODs from three dual enclosures 1010, 1020, 1030. It will be appreciated that the number of loops, enclosures and SBODs in FIG. 10 have been chosen for illustrative purposes only and do not constitute a limitation on the present invention. As described with respect to other FIGS., each enclosure 1010, 1020, 1030 includes redundant intra-enclosure links: in the first enclosure 1010, links 1012A, 1012B; in the second enclosure, links 1022A, 1022B; and in the third enclosure 1030, links 1032A, 1032B.

During normal operations when the enclosures are configured as dual independent enclosures, the intra-enclosure links are disabled.

If one SBOD, such as SBOD 0 in the second enclosure 1020, as illustrated in FIG. 11 fails, all downstream SBODs become inaccessible, in this case SBOD 0 in the third enclosure 1030. The controllers 1004A, 1004B, or either of them, may be programmed or configured to detect errors or failures in the SBODs and to enable the appropriate intra-enclosure links and to reconfigure a storage loop to incorporate operating SBODs which are downstream from the failed SBOD. Thus, the present invention enables the system 1000 to reconfigure its topology in such a way as to bypass a "break" in a loop, In the illustrated example, the intra-enclosure links 1032A, 1032B between the SBODs in the third enclosure 1030 may be enabled, thereby bypassing the failed SBOD and bringing SBOD 0 of the third enclosure 1030 into the second loop 1002B to ensure access to its data. It will be appreciated that the present invention is applicable to the detection of a failure of an SBOD in any loop in any enclosure and is not limited to a failure as illustrated and described herein. The remaining operating loop will be reconfigured to include downstream SBODs in downstream enclosures.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. For example, certain components have been described as being coupled to a backplane and other components as being coupled to a mid-plane. However, such description is not intended to limit components to being coupled to either a backplane or to a mid-plane. Rather, either a backplane and a mid-plane may used and both may be generically labeled as a "connector plane." Moreover, although described above with respect to methods and systems, the need in the art may also be met with a computer program product containing instructions for logically partitioning disk storage enclosures or a method for deploying computing infrastructure comprising integrating computer readable code into a computing system for logically partitioning disk storage enclosures.

What is claimed is:

1. A data storage system, comprising:
first and second storage enclosures, each storage enclosure comprising:
a disk controller partitioned as first and second controller instances;
a plurality of hard disks configured as first and second arrays of disks and managed by the first and second controller instances, respectively; and an intra-enclosure path between the first and second arrays, the intra-enclosure path being disabled during normal operation of the storage system;

a first inter-enclosure path between the first array in the first storage enclosure and the first array in the second storage enclosure, the first inter-enclosure path being enabled during normal operation of the storage system;

a second inter-enclosure path between the second array in the first storage enclosure and the second array in the second storage enclosure, the second inter-enclosure path being enabled during normal operation of the storage system; and a controller, comprising a first path to the first array in the first enclosure and a second path to the second array in the first enclosure whereby, during normal operation of the system, the first arrays in the first and second enclosures are configured as a first storage loop and the second arrays in the first and second enclosures are configured as a second storage loop, the controller being configured to:

detect a failure in the first array of the first enclosure; and enable the intra-enclosure path between the first and second arrays in the second enclosure whereby the second storage loop is reconfigured to include the first array in the second enclosure.

2. The data storage system of claim 1, further comprising a third storage enclosure, comprising:

a third storage enclosure, comprising:

a disk controller partitioned as first and second controller instances;

a plurality of hard disks configured as first and second arrays of disks and managed by the first and second controller instances, respectively; and an intra-enclosure path between the first and second arrays, the intra-enclosure path being disabled during normal operation of the storage system;

a third inter-enclosure path between the first array in the second storage enclosure and the first of array in the third storage enclosure, the third inter-enclosure path being enabled during normal operation of the storage system; and a fourth inter-enclosure path between the second array in the second storage enclosure and the second array in the third storage enclosure, the fourth inter-enclosure path being enabled during normal operation of the storage system;

whereby, during normal operation of the system, the first array in the third storage enclosure is configured into the first storage loop and the second array in the third storage enclosure is configured into the second storage loop; and whereby, upon detection of a failure in the first array of the first enclosure, the second storage loop is further reconfigured to include the first array in the third enclosure.

3. The data storage system of claim 1, wherein the first and second arrays each comprise a switched bunch of disks (SBODs).

4. The data storage system of claim 1, wherein the first and second storage loops each comprise a fibre channel/arbitrated loop (FC-AL).

5. A RAID storage system, comprising:

a first storage loop having a plurality of disk arrays, including first and second arrays, cascaded in a trunking fashion;

a second storage loop having a plurality of disk arrays, including third and fourth arrays, cascaded in a trunking fashion, the first and third arrays comprising a first storage enclosure and the second and fourth arrays comprising a second storage enclosure;

a first intra-enclosure path between the first and third arrays, the first intra-enclosure path being disabled during normal operation of the storage system;

a second intra-enclosure path between the second and fourth arrays, the second intra-enclosure path being disabled during normal operation of the storage system; and a RAID controller coupled to the first and second loops, the RAID controller configured to:

detect a failure in the first array;

enable the second intra-enclosure path between the second and fourth arrays; and reconfigure the second storage loop to include the third array.

6. The RAID system of claim 5, wherein:

the plurality of disk arrays in the first storage loop further includes a fifth array cascaded from the second array in a trunking fashion;

the plurality of disk arrays in the second storage loop further includes a sixth array cascaded from the fourth array in a trun king fashion, the fifth and sixth arrays comprise a third storage enclosure;

the RAID system further includes a third intra-enclosure path between the fifth and sixth arrays, the third intra-enclosure path being disabled during normal operation of the storage system; and the RAID controller is further configured to, upon detection of a failure in the first array, reconfigure the second storage loop to include the fifth array.

7. The RAID storage system of claim 5, wherein the first, second, third and fourth disk arrays each comprise a switched bunch of disks (SBODs).

8. The RAID storage system of claim 5, wherein the first and second storage loops each comprise a fibre channel/arbitrated loop (FC-AL).

9. The RAID storage system of claim 5, wherein the first and second storage enclosures each further include a disk controller partitioned as two controller instances.

10. A method for managing a data storage system having a plurality of storage enclosures, each enclosure having first and second disk arrays, the first disk arrays of each enclosure cascaded as a first storage loop and the second disk arrays of each enclosure cascaded as a second storage loop, the method comprising:

disabling an intra-enclosure path between the first and second disk arrays of each storage enclosure during normal operation of the data storage system;

detecting a failure in the first array of a first of the plurality of storage enclosures;

enabling the intra-enclosure path between the first and second disk arrays in a second of the plurality of storage enclosures; and reconfiguring the second storage loop to include the first disk array in the second enclosure.

11. The method of claim 10, further comprising, upon detecting a failure in the first array of the first storage enclosure, reconfiguring the second storage loop to include the first disk array in a third of the plurality of storage enclosures.

12. The method of claim 10, further comprising partitioning each storage enclosure into a first virtual enclosure having the first disk array and a second virtual enclosure having the second disk array.

13. The method of claim 10, wherein the first and second arrays each comprise a switched bunch of disks (SBODs).

14. The method of claim 10, wherein the first and second storage loops each comprise a fibre channel/arbitrated loop (FC-AL).

15. A method for managing a RAID storage system having first and second storage loops, each storage loop having a plurality of disk arrays, including first and second arrays, cascaded in a trunking fashion, the first arrays of the first and second loops comprising a first storage enclosure and the second arrays of the first and second loops comprising a second storage enclosure, the method comprising:
- disabling a first intra-enclosure path between the first and second arrays in each storage enclosure during normal operation of the RAID storage system;
- detecting a failure in the first array of the first storage enclosure;
- enabling the intra-enclosure path between the first and second arrays in the second storage enclosure; and
- reconfiguring the second storage loop to include the first disk array in the second enclosure.

16. The method of claim 15, wherein the plurality of disk arrays in each storage loop further includes a third array cascaded from the second array, the third arrays of the first and second storage loops comprising a third storage enclosure, the method further comprising, upon detecting a failure in the first array of the first storage enclosure, reconfiguring the second storage loop to include the first disk array in the third storage enclosure.

17. The method of claim 15, wherein the disk arrays each comprise a switched bunch of disks (SBODs).

18. The method of claim 15, wherein the first and second storage loops each comprise a fibre channel/arbitrated loop (FC-AL).

19. The method of claim 15, wherein the first and second storage enclosures each further include a disk controller partitioned as two controller instances.

20. A computer program product of a computer readable storage medium usable with a programmable computer, the computer program product having computer-readable code embodied therein for managing a data storage system having a plurality of storage enclosures, each enclosure having first and second disk arrays, the first disk arrays of each enclosure cascaded as a first storage loop and the second disk arrays of each enclosure cascaded as a second storage loop, the computer-readable code comprising instructions for:
- disabling an intra-enclosure path between the first and second disk arrays of each storage enclosure during normal operation of the data storage system;
- detecting a failure in the first array of a first of the plurality of storage enclosures;
- enabling the intra-enclosure path between the first and second disk arrays in a second of the plurality of storage enclosures; and
- reconfiguring the second storage loop to include the first disk array in the second enclosure.

21. The computer program product of claim 20, the computer-readable code further comprising instructions for, upon detecting a failure in the first array of the first storage enclosure, reconfiguring the second storage loop to include the first disk array in a third of the plurality of storage enclosures.

22. The computer program product of claim 20, the computer-readable code further comprising instructions for partitioning each storage enclosure into a first virtual enclosure having the first disk array and a second virtual enclosure having the second disk array.

23. The computer program product of claim 20, wherein the first and second arrays each comprise a switched bunch of disks (SBODs).

24. The computer program product of claim 20, wherein the first and second storage loops each comprise a fibre channel/arbitrated loop (FC-AL).

25. A method for deploying computing infrastructure, comprising integrating computer readable code into a computing system having a plurality of storage enclosures, each enclosure having first and second disk arrays, the first disk arrays of each enclosure cascaded as a first storage loop and the second disk arrays of each enclosure cascaded as a second storage loop, wherein the code, in combination with the computing system, is capable of performing the following:
- disabling an intra-enclosure path between the first and second disk arrays of each storage enclosure during normal operation of the data storage system;
- detecting a failure in the first array of a first of the plurality of storage enclosures;
- enabling the intra-enclosure path between the first and second disk arrays in a second of the plurality of storage enclosures; and
- reconfiguring the second storage loop to include the first disk array in the second enclosure.

26. The method of claim 25, further comprising, upon detecting a failure in the first array of the first storage enclosure, reconfiguring the second storage loop to include the first disk array in a third of the plurality of storage enclosures.

27. The method of claim 25, further comprising partitioning each storage enclosure into a first virtual enclosure having the first disk array and a second virtual enclosure having the second disk array.

28. The method of claim 25, wherein the first and second arrays each comprise a switched bunch of disks (SBODs).

29. The method of claim 25, wherein the first and second storage loops each comprise a fibre channel/arbitrated loop (FC-AL).

* * * * *